United States Patent [19]

Nicks

[11] Patent Number: 4,590,699
[45] Date of Patent: May 27, 1986

[54] FOLDABLE AND EXTENDABLE DECOY

[76] Inventor: David Nicks, Rte. 1, Box 241, Gerald, Mo. 63037

[21] Appl. No.: 760,266

[22] Filed: Jul. 29, 1985

[51] Int. Cl.$^4$ ............................................. A01M 31/06
[52] U.S. Cl. ............................................................ 43/2
[58] Field of Search .......................... 43/2, 3, 1; D3/3; 416/73

[56] References Cited

U.S. PATENT DOCUMENTS

| D. 8,364 | 6/1875 | Metz | D3/3 |
|---|---|---|---|
| 311,877 | 2/1885 | Danz | 43/3 |
| 2,501,517 | 3/1950 | Honald | 43/1 |
| 3,162,975 | 12/1964 | Amato | 43/3 |
| 3,241,749 | 3/1966 | Nagle | 416/73 |
| 4,339,887 | 7/1982 | Streeter | 43/2 |

FOREIGN PATENT DOCUMENTS 383031 11/1932 United Kingdom ................. 43/2

Primary Examiner—Gene P. Crosby
Attorney, Agent, or Firm—Rey Eilers

[57] ABSTRACT

A decoy has a number of elongated members which can be held in close proximity during the storing or transporting of the decoy but which can be moved to extended position whenever the decoy is in use. A readily collapsible and extendible surface is secured to and supported by those elongated members; and it bears a pictorial representation of the creature to be simulated by the decoy. Those elongated members are mounted so one of those elongated members will be the forward-most of those members whenever the decoy is in use, so some of the other elongated members are extendible outwardly and rearwardly in one direction from that one elongated member, so the rest of the elongated members are extendible in the opposite direction from that one elongated member, and so those elongated members can cause each side of the readily collapsible and extendible surface to extend outwardly and rearwardly from that one elongated member.

8 Claims, 7 Drawing Figures

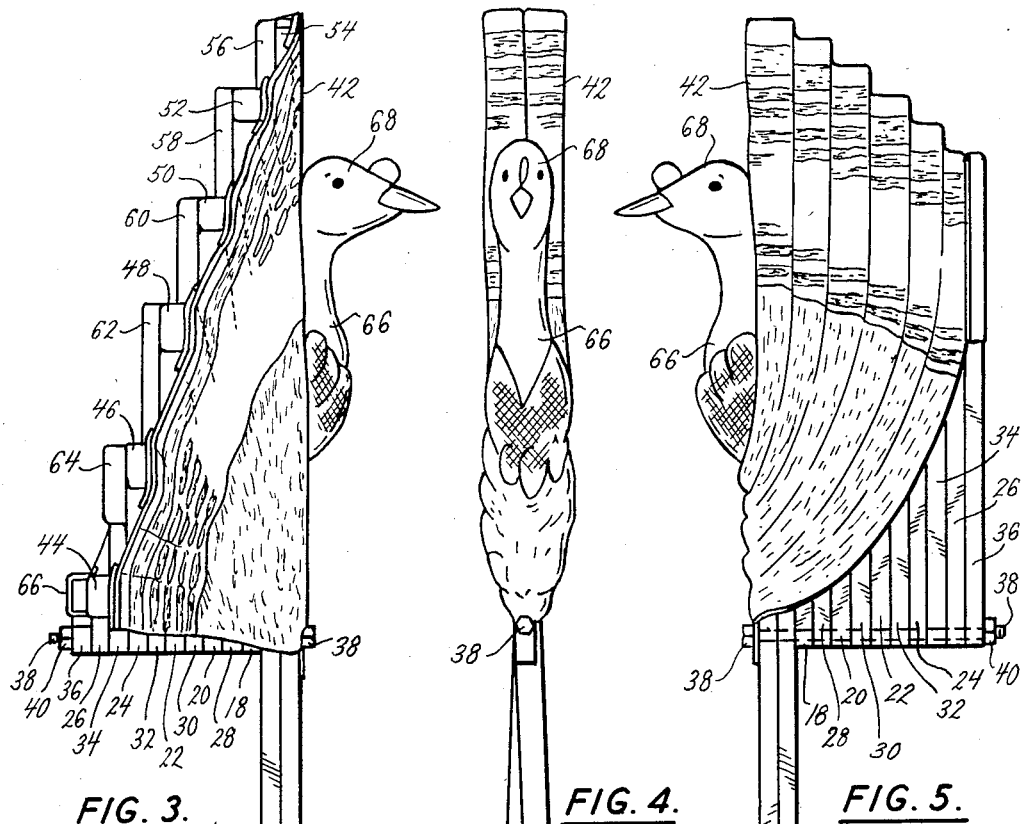
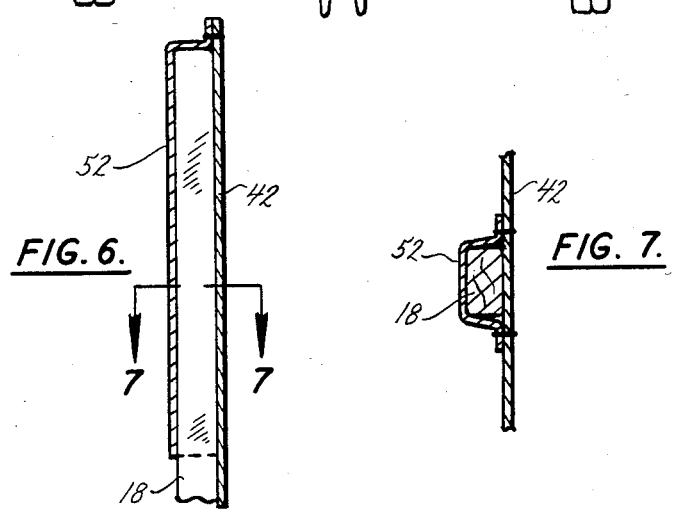

FOLDABLE AND EXTENDABLE DECOY

SUMMARY OF THE INVENTION

A decoy has a number of elongated members which can be held in close proximity during the storing or transporting of that decoy, but which can be moved to extended position whenever that decoy is in use. A readily collapsible and extendible surface is secured to and supported by those elongated members; and that surface bears a pictorial representation of the creature which is to be simulated by the decoy. Those elongated members and that readily collapsible and extendible surface can be made to occupy only a very small volume during the storing and transporting of that decoy; but they can be extended to provide a large and life-like representation of part of that creature. It is, therefore, an object of the present invention to provide a decoy which has a number of elongated members that are selectively held adjacent each other during the storing and transporting of the decoy, but which can be moved into spaced relation during use of the decoy and which support a readily collapsible and extendible surface that bears a representation of a creature.

The elongated members of the decoy are mounted so one of those elongated members will be the forwardmost of those members whenever the decoy is in use; and so some of the other elongated members will be extendible outwardly and rearwardly in one direction from that one elongated member, while the rest of those elongated members are extendible outwardly and rearwardly in the opposite direction from that one elongated member. The elongated members which are extendible outwardly and rearwardly in one direction will cause about one-half of the readily collapsible and extendible surface to extend outwardly and rearwardly in that same direction; and the rest of those elongated members will cause the rest of the readily collapsible and extendible surface to extend outwardly and rearwardly in the opposite direction. As a result, the elongated members and the readily collapsible and extendible surface can provide a large and life-like representation of part of the body and of the tail of the creature. It is, therefore, an object of the present invention to provide a decoy with a plurality of elongated members and with part of a surface which can be extended outwardly and rearwardly in one direction, and to provide a further plurality of elongated members and a further part of that surface which can be extended outwardly and rearwardly in the opposite direction to simulate part of the body and of the tail of a creature.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

BRIEF DESCRIPTION OF THE DRAWING

In the drawing,

FIG. 3 is a side view of the decoy shown in FIG. 1;

FIG. 4 is a front elevational view of the decoy of FIGS. 1-3 as it appears when it has been folded for transporting or storing;

FIG. 5 is a side elevational view of the decoy in its folded condition;

FIG. 6 is a sectional view, on a larger scale, which is taken along a plane indicated by the line 6—6 in FIG. 2; and FIG. 7 is a sectional view, on the scale of FIG. 6, which is taken along a plane indicated by the line 7—7 in FIG. 6.

DETAILED DESCRIPTION OF PREFERRED EMBODIMENT

Figures 1, 2:
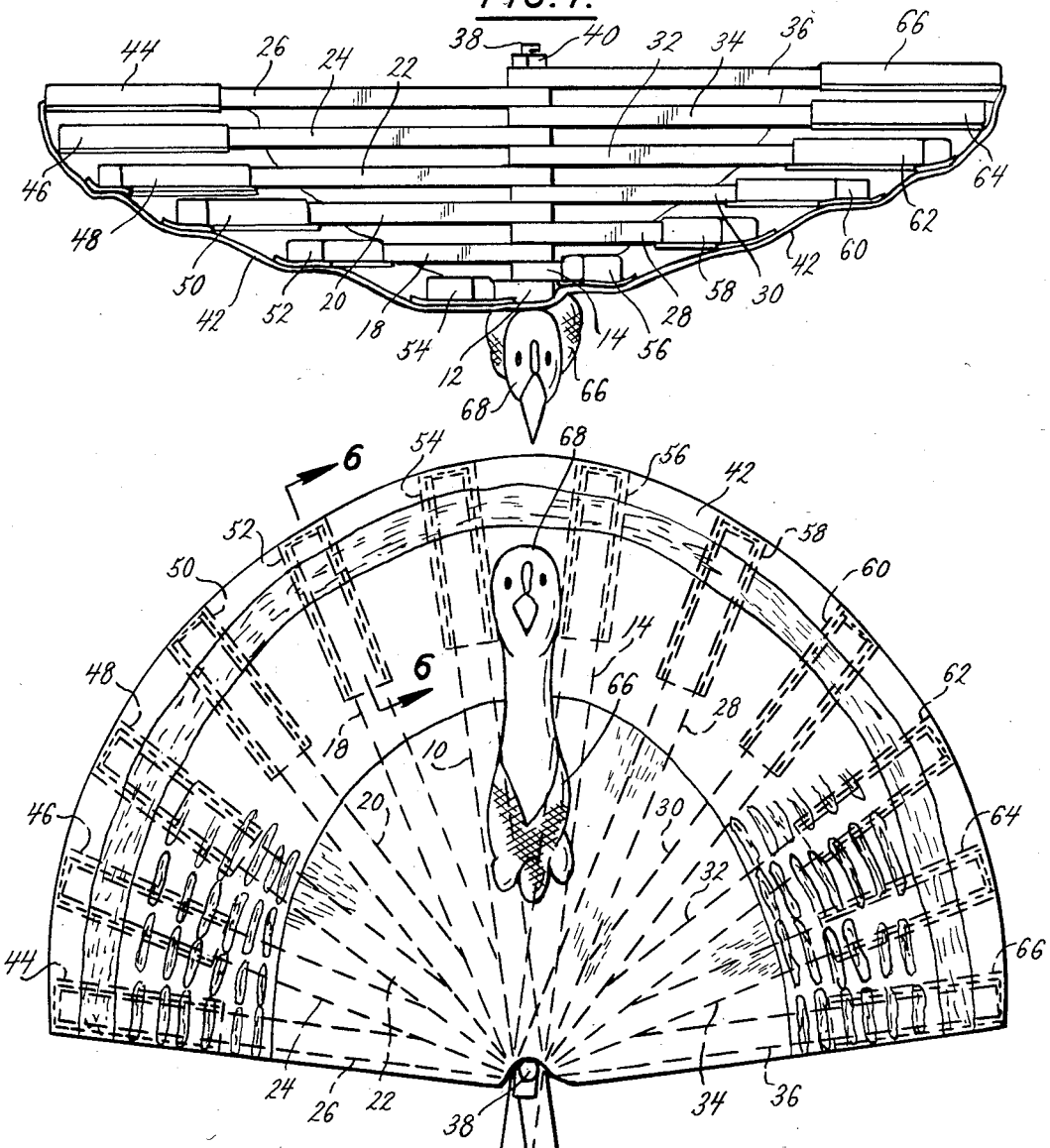
FIG. 1 is a plan view of one preferred embodiment of decoy which is made in accordance with the principles and teachings of the present invention, and it shows that decoy in condition to be used.
FIG. 2 is a front elevational view of the decoy shown in FIG. 1.

Referring to the drawing in detail, the numeral 10 denotes a stick which has a foot 12 at the lower end thereof; and the numeral 14 denotes a stick which has a foot 16 at the lower end thereof. The numerals 18, 20, 22, 24, 26, 28, 30, 32, 34 and 36 denote further sticks; and, as shown by FIG. 2, the sticks have varying lengths. Openings, not shown, are provided in the sticks; and the openings in the sticks 10 and 14 are at the upper ends of the feet 12 and 16, while the openings in the rest of the sticks are adjacent the lower ends of those sticks. An elongated bolt 38 passes through all of those openings to maintain all of the sticks in assembled relation. A nut 40 is threaded onto the threaded end of that bolt, as shown particularly by FIGS. 1, 3 and 5.

The numeral 42 denotes a generally semi-circular flexible surface on which is painted, printed or otherwise formed a representation of part of the body and of the tail of the creature which is to be simulated by the decoy. In the preferred embodiment of the present invention, that creature is a wild turkey; but the invention is not limited to use with decoys which simulate wild turkeys. Instead, the present invention is usable with a decoy for any kind of creature which has a body and tail that can be represented by an extended, generally vertical surface.

A number of pockets 44, 46, 48, 50, 52, 54, 56, 58, 60, 62, 64 and 65 are provided adjacent the periphery of the rear face of the surface 42. Each of those pockets has a closed outer end and an open inner end; and each of those pockets is dimensioned to telescope over the outer end of one of the sticks. FIG. 1 shows the pockets in solid lines, and FIG. 2 shows those pockets in dotted lines, as they appear when they are telescoped over the outer ends of the sticks and those sticks are in angularly-displaced positions. FIGS. 6 and 7 show the details of the pocket 52; and all of the other pockets will be identical to that pocket except for the length thereof. The telescoping of the pockets over the outer ends of the sticks will enable those pockets to hold the surface 42 in assembled relation with those sticks, and will thereby enable those sticks to cause that surface to assume a generally spherical curvature in plan view, as indicated by FIGS. 1 and 3. That curvature is desirable, because it keeps the body and tail areas of the decoy from having an unnatural, flat appearance. That generally-spherical appearance is attained by having every other stick displacable to the left of the vertical, and by having the intervening sticks displacable to the right of the vertical. This is in contrast to the practice, in a foldable fan, of having each succeeding stick displaced even further from the vertical.

The numeral 66 denotes a simulation of the front of the body plus the neck of a wild turkey. The numeral 68 denotes a simulation of the head of a wild turkey. Those simulations are connected to the center of the surface 42 so they will be held erect, and hence will look lifelike whenever the decoy is in use.

The sticks can be made, in whole or in part, of wood, plastic, metal, treated paper or any other suitable material. In the preferred embodiment of the present invention, the sticks 10, 14, 18 and 28 are sixteen and one-fourth ($16\frac{1}{4}$) inches long, the sticks 20 and 30 are thirteen and a half ($13\frac{1}{2}$) inches long, the sticks 22 and 32 are fifteen and a fourth ($15\frac{1}{4}$) inches long, the sticks 24 and 34 are fourteen and seven-eighths ($14\frac{7}{8}$) inches long, and the sticks 26 and 36 are fourteen and a half ($14\frac{1}{2}$) inches long. However, those sticks can be given whatever dimensions are required to enable the surface 42 to simulate the particular kind and size of creature which is to be decoyed. Each of the feet 12 and 16 is approximately twelve (12) inches long.

The surface 42 can be made, in whole or in part, of plastic, rubber, fabric, treated paper or any other suitable material. The front face of that surface will bear the markings of the creature which is to be simulated; and, in the preferred embodiment of the present invention, it has the markings of a wild turkey. Specifically, the outermost area of the front face of surface 42 will be a band of a light tan or brown color which is about one inch wide, a very dark band of slightly greater width will extend inwardly from that outermost band, a four inch wide band of alternating light and dark brown arcuate strips is disposed inwardly of that very dark band, and the rest of that front surface is a very dark semicircle. Simulations of wings can be sewn or glued onto that very dark semicircle, or they can be painted or printed as lighter parts of the representation on that semicircle.

The portion 66 which simulates the front of the body plus the neck of the creature can be made, in whole or in part, from plastic, rubber, stuffed fabric or any other suitable material. The head 68 can be made, in whole or in part, of plastic, rubber, wood, treated paper, fabric, knitted or crocheted yarn, or of any other suitable material. The beard of the decoy can be made of string, rope or filaments which simulate hair. The eyes for the head 68 can be glass, buttons, plastic or vinyl; or those eyes can be painted or printed representations. The wattles also can be made of plastic, rubber, wood, stuffed fabric, treated paper or the like. The feet 12 and 16 will be painted a color which is comparable to the color of the legs of the creature to be simulated by the decoy.

Washers, not shown, are interposed between adjacent sticks; and those washers will provide small spaces between the adjacent sticks. The bolt 38 passes through those washers as well as through the sticks. Those washers facilitate ready displacement of the sticks relative to each other, and also facilitate ready folding of the decoy to the compact form shown by FIGS. 4 and 5. Although a hexagonal nut 40 is shown, a wing nut will preferably be used.

In using the decoy provided by the present invention, the hunter will select an area which the creature, that is simulated by the decoy, is likely to use as its habitat or is likely to use as an area of transit. After making certain that no other hunters are in the area, he will rotate the sticks from the folded position of FIGS. 4 and 5 to the angularly-displaced positions of FIGS. 1-3. Thereafter, he will support the decoy by pressing the feet 12 and 16 into the earth, by inserting those feet into a space which is defined by roots, rocks, stones, logs, tree trunks, or will otherwise render those feet immobile and upright. Thereafter, he will seek a position where he can see the decoy but will, himself, be essentially invisible to a creature attracted by that decoy. The hunter will then, if he has the equipment or the ability to do so, audibly simulate the call of that creature. The decoy, which simulates a wild turkey, has proved to be very lifelike and to effectively attract wild turkeys.

When the hunter is ready to leave the area, he will again make certain that no other hunters are in the area; and then he will raise the decoy from its position and rotate the sticks to the compact, folded positions shown by FIGS. 4 and 5. As those sticks are moved toward those compact positions, they will move the pockets toward each other; and those pockets will prevent the upper ends of the sticks from being moved into full registry with each other. However, the washers between adjacent sticks enable the outer ends of those sticks to be moved into, or closely adjacent to, the compact positions shown by FIG. 4—even though those outer ends are within the pockets at the rear face of surface 42. In the position of FIGS. 4 and 5, the decoy is readily transported; because the sticks and the surface 42 occupy a space that is only slightly wider than the width of the portion 66 or of the head 68.

If desired, the decoy could be provided with a stick which would support the center of the surface 42, and which would be wide enough so that it could have two bolts extending rearwardly therefrom. In such event, the sticks which were to be disposed in angularly-displaced array at the left of the vertical could be secured to one of those bolts, and the sticks which were to be disposed in angularly-displaced array at the right of the vertical could be secured to the other of those bolts. However, the single pivot 38 has been found to be very useful and workable, it avoids the cost of two pivots, and it avoids the extra width of a stick which is wide enough to accomodate two pivots.

Whereas the drawing and accompanying description have shown and described a preferred embodiment of the present invention it should be apparent to those skilled in the art that various changes may be made in the form of the invention without affecting the scope thereof.

What I claim is:

1. A readily-transported, readily-stored, light-weight decoy which comprises a plurality of elongated members that are held for selective movement into close proximity to each other during the transporting or storing of said decoy and for selective movement away from each other into spaced relation during use of said decoy, and a collapsible and extendible surface which is supported by said plurality of elongated members, said surface being in its collapsed condition whenever said elongated members are in close proximity to each other during the transporting or storing of said decoy but being in its extended condition whenever said elongated members are in said spaced relation during use of said decoy, said collapsible and extendible surface having a pictorial representation thereon which makes said decoy appear lifelike, said elongated members and said collapsible and extendable surface represent the tail portion of a creature, and wherein a three-dimensional representation of the neck and head of said creature is provided at the front face of said readily-extended and collapsed surface.

2. A decoy as claimed in claim 1 wherein at least one of said elongated members has a portion of the lower end thereof capable of being immobile and upright to help make said decoy self-supporting.

3. A decoy as claimed in claim 1 wherein said plurality of elongated members are held adjacent the lower ends thereof, wherein the upper ends of said elongated members are selectively movable toward and away from each other, and wherein said collapsible and extendible surface has an upper portion that collapses as said elongated members are moved into close proximity to each other and that extends as said elongated members are moved to said spaced relation.

4. A decoy as claimed in claim 1 wherein said three-dimensional representation of the neck and head of said creature is connected to the front of said collapsible and extendible surface, and wherein said collapsible and extendible surface has, when in its collapsed condition, a width that is not substantially greater than the width of said three-dimensional representation of said neck and head of said creature, but wherein said collapsible and extendible surface has a width that is many times greater than the width of said representation of said neck and head of said creature when said collapsible and extendible surface is in its extended condition.

5. A decoy as claimed in claim 1 wherein said three-dimensional representation of the neck and head of a creature is connected to the front of the center of said collapsible and extendible surface, wherein said elongated members are displaced outwardly and rearwardly from said representation of said neck and head of said creature whenever said elongated members are moved to said spaced relation, whereby said representation of said head and neck of said creature are the forwardmost portions of said decoy, and wherein said collapsible and extendible surface and said elongated members providing said representation of the tail of said creature inclines outwardly and rearwardly from said representation of said head and said neck of said creature.

6. A decoy as claimed in claim 1 wherein the outer ends of said elongated members are secured to the rear face of said collapsible and extendible surface.

7. A decoy as claimed in claim 1 wherein the outer ends of said elongated members are secured to the rear face of said collapsible and extendible surface by pockets which have open inner ends that telescope over the outer ends of said elongated members.

8. A readily-transported, readily-stored, light-weight decoy which comprises a plurality of elongated members that are held for selective movement into close proximity to each other during the transporting or storing of said decoy and for selective movement away from each other into spaced relation during use of said decoy, and a collapsible and extendible surface which is supported by said plurality of elongated members, said surface being in its collapsed condition whenever said elongated members are in close proximity to each other during the transporting or storing of said decoy but being in its extended condition whenever said elongated members are in said spaced relation during use of said decoy, said collapsible and extendible surface having a pictorial representation thereon which makes said decoy appear lifelike, one of said elongated members is disposed forwardly of other of said elongated members whenever said decoy is in use, wherein a group of said elongated members are disposed rearwardly of said one elongated member and are movable away from said one elongated member in one direction to define an outwardly-extending and rearwardly-extending configuration which will cause one-half of said collapsible and extendible surface to incline outwardly and rearwardly away from said one elongated member, and wherein a further group of said elongated members are disposed rearwardly of said one elongated member and are movable away from the first said group of elongated members in the opposite direction to define an outwardly-extending and rearwardly-extending configuration which will cause the other half of said collapsible and extendible surface to extend outwardly and rearwardly from said one elongated member.

* * * * *